United States Patent
Kato et al.

(10) Patent No.: US 9,044,736 B2
(45) Date of Patent: Jun. 2, 2015

(54) METHOD FOR PRODUCING METAL SUBSTRATE FOR FLUE GAS DENITRATION CATALYST

(75) Inventors: Yasuyoshi Kato, Kure (JP); Naomi Imada, Kure (JP); Keiichiro Kai, Kure (JP); Kotoe Matsuyama, Kure (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 298 days.

(21) Appl. No.: 13/807,086

(22) PCT Filed: Jun. 28, 2011

(86) PCT No.: PCT/JP2011/064783
§ 371 (c)(1),
(2), (4) Date: Apr. 10, 2013

(87) PCT Pub. No.: WO2012/002375
PCT Pub. Date: Jan. 5, 2012

(65) Prior Publication Data
US 2014/0228208 A1 Aug. 14, 2014

(30) Foreign Application Priority Data
Jun. 29, 2010 (JP) .................................. 2010-147626

(51) Int. Cl.
*B01J 27/00* (2006.01)
*B01J 27/188* (2006.01)
(Continued)

(52) U.S. Cl.
CPC .......... *B01J 27/188* (2013.01); *B01D 53/8625* (2013.01); *B01D 2255/20707* (2013.01);
(Continued)

(58) Field of Classification Search
USPC .......... 502/208, 210, 350, 439; 427/226, 301, 427/318, 327, 359, 365, 366, 419.2, 430.1, 427/431, 435
IPC .......... B01J 27/00,27/188, 23/00, 21/04, 23/02; B05D 1/18, 1/36, 3/00, 3/02, 3/04, 3/10, B05D 3/12, 7/00
See application file for complete search history.

(56) References Cited

U.S. PATENT DOCUMENTS 3,455,731 A * 7/1969 Hathaway, Jr. et al. ....... 427/226
4,018,706 A * 4/1977 Inoue et al. .................. 502/248
(Continued)

FOREIGN PATENT DOCUMENTS

DE 199 15 681 10/2000
DE 10 2005 023 6 11/2006
(Continued)

OTHER PUBLICATIONS
International Search Report mailed Aug. 2, 2011 for International application No. PCT/JP2011/064783.
(Continued)

*Primary Examiner* — Patricia L Hailey
(74) *Attorney, Agent, or Firm* — Fay Sharpe LLP

(57) ABSTRACT

A metal substrate for flue gas-denitration catalyst that, like SUS304, can be used without corroding is provided by improving the corrosion resistance of SUS430 substrate that is inexpensive and can easily be supplied stably. A method for producing the metal substrate for flue gas-denitration catalyst, wherein the method comprising the steps of: lath-processing a band-shaped steel plate made of ferrite stainless steel into a band-shaped metal lath; (1) degreasing process oil adhering to the metal lath; (2) passing the metal lath through a solution containing phosphoric acid and surfactant to load the solution; (3) draining off the excess solution; and (4) drying and heating the solution-loaded metal lath to react the phosphoric acid with the substrate, in which respective steps are carried out sequentially to form a film of phosphate compound on a surface of the substrate.

10 Claims, 1 Drawing Sheet

1 SUS430 band shaped plate
2 Metal lath processor
3 Metal lath
4 Degreasing apparatus
5 Solution composed of Phosphoric acid and surfactant
6 Air blow apparatus
7 Drying and heating furnace
8 Coating apparatus
9 Molding apparatus
10 Cutting device
11 Stacking step
12 Pinch rollers
13 Roll

(51) Int. Cl.
  *B01J 23/00* (2006.01)
  *B01J 23/02* (2006.01)
  *B01J 21/04* (2006.01)
  *B05D 1/18* (2006.01)
  *B05D 1/36* (2006.01)
  *B05D 3/02* (2006.01)
  *B05D 3/04* (2006.01)
  *B05D 3/10* (2006.01)
  *B05D 3/12* (2006.01)
  *B05D 7/00* (2006.01)
  *B01D 53/86* (2006.01)
  *B01J 37/02* (2006.01)
  *B01J 23/28* (2006.01)
  *B01J 35/00* (2006.01)
  *B01J 37/00* (2006.01)
  *B01J 37/28* (2006.01)
  *B01J 27/199* (2006.01)

(52) U.S. Cl.
  CPC ............. *B01D2255/20723* (2013.01); *B01D 2255/20769* (2013.01); *B01D 2255/30* (2013.01); *B01J 37/0225* (2013.01); *B01J 37/0234* (2013.01); *B01J 37/28* (2013.01); *B01J 23/002* (2013.01); *B01J 23/28* (2013.01); *B01J 27/199* (2013.01); *B01J 35/0026* (2013.01); *B01J 37/0009* (2013.01); *B01J 37/0207* (2013.01); *B01J 37/0217* (2013.01); *B01J 2523/00* (2013.01); *B01J 37/0203* (2013.01)

(56) References Cited

U.S. PATENT DOCUMENTS

| | | | | |
|---|---|---|---|---|
| 4,911,953 A | * | 3/1990 | Hosonuma et al. | 427/224 |
| 5,267,390 A | * | 12/1993 | Yang et al. | 29/527.4 |
| 6,676,919 B1 | | 1/2004 | Fischer et al. | |

FOREIGN PATENT DOCUMENTS

| | | | | |
|---|---|---|---|---|
| JP | 4193962 | | 7/1992 | |
| JP | 8117614 | | 5/1996 | |
| WO | WO 02/07872 | | 1/2002 | |
| WO | 2012/002375 | * | 1/2012 | B01J 27/199 |

OTHER PUBLICATIONS

International Preliminary Report on Patentability and Written Opinion of the International Searching Authority mailed Aug. 2, 2011 for International application No. PCT/JP2011/064783.

Extended European Search Report completed Jul. 15, 2014 for Application No. EP 11 80 0839.

* cited by examiner

1 SUS430 band shaped plate
2 Metal lath processor
3 Metal lath
4 Degreasing apparatus
5 Solution composed of Phosphoric acid and surfactant
6 Air blow apparatus
7 Drying and heating furnace
8 Coating apparatus
9 Molding apparatus
10 Cutting device
11 Stacking step
12 Pinch rollers
13 Roll

METHOD FOR PRODUCING METAL SUBSTRATE FOR FLUE GAS DENITRATION CATALYST

TECHNICAL FIELD

The present invention relates to a method for producing a metal substrate for flue gas-denitration catalyst, and especially to a method for producing the metal substrate by forming a film capable of preventing corrosion caused by sulfur oxide ($SO_3$) on the surface of a metal lath used in a plate shaped catalyst supporting a catalyst component, in a way that is both inexpensive and appropriate for mass production, and to a method for producing a flue gas-denitration catalyst using the substrate.

BACKGROUND ART

A so-called flue gas-denitration apparatus that detoxifies nitrogen oxide by using ammonia or urea as a reducing agent and titanium oxide as catalyst has been widely used, worldwide, largely for the purpose of treating boiler flue gas. A variety of configurations for the catalyst has been used, including a plate like type wherein the catalyst is supported on a metal or ceramic lath, honeycomb type wherein a catalyst ingredient is formed into a honeycomb shape, and a granular type. In the field of flue gas-denitration, the former two types dominate the market.

As the substrate used for the plate type catalyst, stainless steel (SUS) is used, wherein a band-shaped stainless steel is generally formed into a metal lath. Specific examples of the stainless steel include ferrite stainless steel (SUS430) and austenite stainless steel (SUS304), and they have been used selectively for different purposes.

DISCLOSURE OF THE INVENTION

Problems to be Solved by the Invention

As mentioned in the conventional technology above, different base material have been used for different purposes as the substrate for flue gas-denitration catalyst, for example, expensive SUS304 has been primarily used for situations where high degree of corrosion is expected, while SUS430 has been used in a relatively mild corrosive environment. However, in recent years, the demand for metal materials such as rare metals has significantly increased, which has led to a steep rise in the prices of SUS materials, making it more difficult to continue the above described strategy for using different SUS for different purposes. SUS304 is especially prone to be affected by price hikes of metal materials, and exerts a significant influence on the prices of catalysts. On the other hand, in the US, majority of boilers use high S coal, emitting 50 to 100 ppm of sulfur oxide ($SO_3$) in the flue gas in many cases, therefore, the corrosion of SUS430 substrate used in the catalyst for flue gas-denitration is becoming more and more a problem that can no longer be ignored.

The problems to be solved by the present invention in view of the above, is to provide a metal substrate for flue gas-denitration catalyst that improves the anti-corrosive property of SUS430 substrate which is inexpensive and can easily be supplied stably, and that can be used in a similar way as SU304 without being easily corroded.

Means for Solving the Problems

In order to solve the above-mentioned problems, the invention that is claimed in the present application provides the following.

(1) A method for producing a metal substrate for flue gas-denitration catalyst, wherein the method comprising the steps of: (1) degreasing process oil adhering to a band-shaped metal lath wherein the metal lath is made of a band-shaped steel plate composed of ferrite stainless steel by lath-processing; (2) passing the degreased metal lath through a solution containing phosphoric acid and surfactant to load the solution; (3) draining off the excess solution; and (4) drying and heating the solution-loaded metal lath to react the phosphoric acid with the metal lath, wherein respective steps are carried out sequentially to form a film of phosphate compound on a surface of the metal lath.

(2) A method for producing a metal substrate for flue gas-denitration catalyst, wherein the method comprising the steps of: (1) degreasing process oil adhering to a band-shaped metal lath wherein the metal lath is made of a band-shaped steel plate composed of ferrite stainless steel by lath-processing; (2) winding the degreased metal lath into a roll; (3) passing the obtained roll through a solution containing phosphoric acid and surfactant to load the solution; (4) draining off the solution by air blowing or by centrifugal force; and then (5) drying and heating the roll to form a corrosion resistant film on the metal lath surface by reaction of the phosphoric acid and the metal lath.

(3) The method according to (1) or (2), wherein the ferrite stainless steel plate is SUS430 stainless band-shaped steel plate.

(4) The method according to any one of (1) to (3), wherein the heating is performed at the temperature of 300 deg C. or more.

(5) The method according to any one of (1) to (4), wherein the thickness of the corrosion resistant phosphate compound film is not less than 1 μm.

(6) A method for producing a flue gas-denitration catalyst comprising the steps of: placing a paste of catalyst ingredient comprising titanium oxide as a main component onto the substrate obtained by the method according to any one of claims 1 to 4; passing the substrate between a pair of top and bottom rollers; applying the catalyst paste into the openings and onto the surface of the metal lath; and then drying and firing the product obtained thereby.

When the catalyst using a metal lath made from ferrite stainless steel plate (SU430) as the catalyst base material, is utilized in treating flue gas having a high concentration of $SO_3$, $SO_3$ in the flue gas and SUS430 react as shown in the formula below, and the surface of the base material is gradually oxidized. A part of the oxidized iron then reacts with SOX in the flue gas, forming sulfates that under a humid environment such as when shutdown of the machine, the sulfate deliquesces and migrates into catalyst component, which increases the $SO_2$ oxidizing activity of the catalyst.

$$Fe + SO_3 \rightarrow FeO + SO_2 \quad \text{(formula 1)}$$

In order to prevent the oxidative corrosion of SUS430 by $SO_3$, the present inventors tried such methods as film formation by coating with granular stable oxide as well as passivation film formation on the surface of SUS by phosphate, however, fell short of preventing the direct reaction between the gaseous $SO_3$ and the metal. This was presumed to be due to the failure of completely preventing the diffusion of $SO_3$ molecules because of porous nature of the film, or to the fact that the film was not thick enough to prevent the reaction with $SO_3$. For this reason, the present inventors diligently researched into the formation method for a film that is fine, thick, and has a superior adhesiveness quality, and arrived at the method of the present invention.

The treatment of the present invention is different from the conventional method in which a thin passivation film of adsorbed phosphate is formed on the surface of the metal, and involves, rather, forming a fine and thick layer of iron phosphate or chrome phosphate on the surface of the metal that is sufficient to block the diffusion of gases to the base material surface, by reacting 0.1% to several % of metal for the base material with phosphate. Specifically, it involves lath-processing SUS430 base material into a metal lath. immersing the metal lath into an aqueous solution comprising phosphate and surfactant, draining off the excess solution by air blowing to form a liquid film of the solution on the surface of the metal lath, drying by ventilating, and then heat treating at the preferable temperature of 300 deg C. or more.

By performing the above treatment, the liquid film is maintained even during the drying step, by the action of the surfactant, and the film of phosphate is formed on the metal surface. When this film is heated above the temperature of 300 deg C., it becomes highly reactive strong phosphoric acid, reacting with Fe and Cr in SUS430 and forming a fine film of relevant salt. Since 0.1% to several % of the metal is reacted with phosphate, the film is not less than 1 μm, preferably between 2 μm and several μm in thickness, and can effectively prevent $SO_3$ gas from contacting the metal.

The critical feature of the method of the present invention lies in the fact that it enables formation of a uniform film of phosphate salt without introducing any cracks even at the substantial thickness of several μm, by forming a uniform liquid film by the action of surfactant during the aqueous solution phase, and by transforming it to viscous phosphoric acid and further to viscous strong phosphoric acid during the drying phase, and by directly reacting the strong phosphoric acid and SUS430 base material.

Advantageous Effect of the Invention

As described above, according to the method of the present invention, the catalyst substrate produced from SUS430 is protected from the corrosion mediated by $SO_3$. As the result, inexpensive SUS430 base material can be adopted as a substrate for denitration catalyst used in highly corrosive environment with high $SO_3$ concentration, thereby contributing to cutting the cost associated with procuring catalyst using SUS304 base material that is prone to steep price hikes.

EMBODIMENTS FOR CARRYING OUT THE INVENTION

Figure 1:
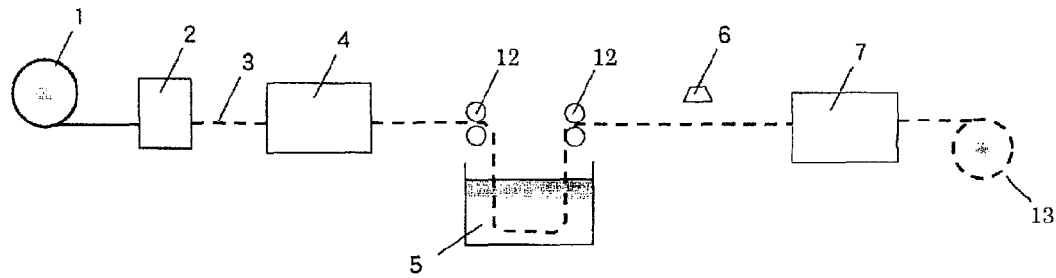
FIG. 1 an explanatory diagram illustrating a production flow of a catalyst substrate with minimum instrumentation for carrying out the present invention.

FIG. 1 is an explanatory illustrating a production flow of a catalyst substrate with minimum instrumentation for carrying out the present invention.

A band-shaped SUS430 steel plate 1 having a thickness of 0.1 mm to 0.3 mm is processed by a metal lath processer 2 into a metal lath 3 having openings of several mm in diameter, which in turn is fed into a degreasing apparatus 4 to remove (degrease) process oil by heating or washing. The treated metal lath then is passed through a solution 5 containing phosphoric acid and surfactant, and subjected to an air blow apparatus 6 that blows compressed air to drain off the excess solution, and then an uniform liquid film of phosphoric acid balanced by its surface tension is formed on the surface of the metal lath. Subsequently, the metal lath is fed into drying and heating furnace 7 so as to be dried and heated at a temperature of 300 deg C. or more. Thereby transforming phosphoric acid into strong phosphoric acid and reaction between the strong phosphoric acid and the metal result in forming a strong film of phosphate salt on the surface. The metal lath is then wound into a roll 13. In the drawings, 12 denotes pinch rollers.

A concentration of phosphoric acid in a solution containing phosphoric acid and surfactant, depends on a required thickness of a film formed, however, good results are more likely to be obtained when it is more than 1% by weight and no more than 50% by weight, preferably between 1% by weight and 20% by weight.

In terms of the surfactant for use, non-ionic surfactants that do not lose efficacy even under strong acidic conditions, such as in phosphoric acid, are preferred. Preferable examples include those that are usually used under strong acidic conditions such as alkylphenoxypolyethyleneglycol type non-ionic surfactant (product name "Triton X-100" produced from Roche). There are no limitations in terms of the amount of added surfactant, however, not less than 0.01% by weight and not more than 0.1% by weight is normally preferred. If it is less than 0.01% by weight, the action of surfactant is not sufficient, while if it is too much, foaming will become an issue. In the Examples, an example in which a band-shaped metal lath are subjected to respective treatment steps continuously is disclosed, however, it goes without saying that depending on the cases where the treatment speed of respective steps differ significantly, or there are complications in terms of where respective steps are physically located, one may cut the band-shaped lath between the steps and store it temporarily by winding it into a roll, or move it to a different location.

Figure 2:
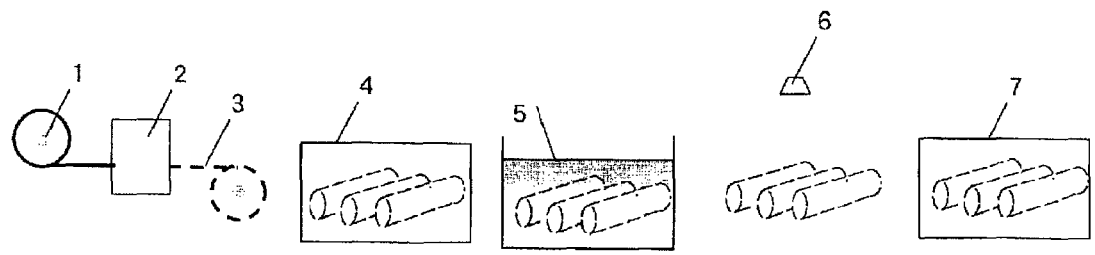
FIG. 2 an explanatory diagram illustrating a production method of the catalyst substrate according to other examples of the present invention.

FIG. 2 is an explanatory diagram illustrating a production method of the catalyst substrate according to other examples of the present invention. In contrast to the example of FIG. 1, here, the processed metal lath is rolled up first, and then the obtained roll of metal lath is sent to a degreasing apparatus 4 as shown in FIG. 2 to remove process oil, after which it is immersed in solution 5 composed of phosphoric acid and surfactant. Following the draining off of the excess solution by air blow apparatus 6, it is heat treated in a drying and heating furnace 7. In this example, the advantage lies in the ability to easily treat and store the metal lath in a roll, rather than treating the metal lath as a band as in the example of FIG. 1.

Figure 3:
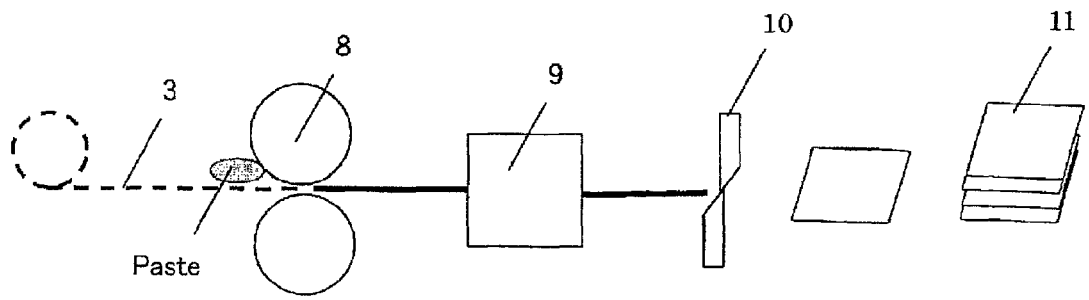
FIG. 3 an explanatory diagram illustrating a process of producing the catalyst substrate from a metal lath substrate treated with the method of the present invention.

FIG. 3 is an explanatory diagram illustrating a process of producing the catalyst substrate from the metal lath treated with the method of the present invention.

The metal lath 3 is sent to a coating apparatus 8 together with a paste containing denitration catalyst ingredient obtained by publicly known method, and passed between a pair of top and bottom pressuring rollers, thereby coating it with the paste so that the openings of the lath is filled and the surface of the lath is covered with the paste. The band-shaped thin catalyst plate thus obtained can be processed with a molding apparatus 9 with a metal mold so as to form a wavy pattern that acts as the spacers when stacked. After it is cut into rectangular elements by a cutting device 10, the elements are stacked up and assembled into a catalyst unit in step 11.

The catalyst unit thus obtained is dried by venting and fired in a baking furnace to be used as the denitration catalyst.

EXAMPLES

The present invention is described in more details below by way of specific examples.

Example 1

A steel plate made of ferrite stainless steel sheet (SUS430) having a thickness of 0.16 mm and a width of 500 mm was processed into a metal lath, the metal lath was passed through an furnace held at 400 deg C. for about one minute to degrease process oil.

On the other hand, a treatment solution was prepared by mixing an alkylphenoxypolyethyleneglycol type non-ionic surfactant (product name "Triton X-100" produced from Roche) at 0.025% by weight with 10% phosphoric acid, and the degreased metal lath was immersed therein for 30 seconds. After 30 seconds, the metal lath was taken out, and the solution that was retained between the openings of the lath and was dripped off by gravitational force was blown away by blowing compressed air. It then was dried at 150 deg C., heat treated in an electric furnace held at 350 deg C. for 10 minutes to obtain a metal lath with formation of a film composed of phosphoric acid compound on its surface.

Example 2

A metal lath substrate was obtained by the same manner as in Example 1 except that the concentration of the phosphoric acid used in Example 1 was changed to 20% by weight and the heat treatment temperature was changed to 450 deg C.

Examples 3 and 4

Titanium oxide, ammonium molybdate, and ammonium metavanadate were mixed at the atomic ratio of Ti:Mo:V=93.5:5:1.5, to which water, silica sol, and silica ceramic fiber were added, and the mixture was then kneaded in a kneader sufficiently to obtain a paste of catalyst. The catalyst paste was then placed on the substrates of Example 1 and 2 and passed between a pair of pressurizing top and bottom rollers, thereby press-coating the catalyst paste into the lath-openings of the substrate and on the surface of the substrate. This was dried at 150 deg C. for 1 hour and then fired at 500 deg C. for 2 hours to obtain the plate shaped catalyst (coated amount 700 g/m$^2$).

Comparative Example 1

The SUS430 metal lath after the degreasing treatment used in Example 1 was used directly without further treatment.

Comparative Example 2

A metal lath substrate with a formation of film was prepared by the same manner as in Example 1 except that no surfactant was used.

Comparative Example 3

A metal lath substrate was prepared by the same manner as in Example 1 except that the heat treatment temperature was changed from 350 deg C. to 250 deg C.

Comparative Examples 4 to 6

Catalysts were prepared by the same catalyst coating methods as in Examples 3 and 4 except that the substrates of Comparative Examples 1 to 3 were used.

Test Example 1

In regard to the metal lath substrates obtained in Example 1 and 2, and Comparative Example 1 and 2, the amount of weight increase of the substrate after the film forming process was measured. The substrates having size of 100 mm square were washed with 100 ml of water and weight change before and after the washing was examined. In addition, the status of the film as well as the distribution of phosphorous (P) were observed using an electron microscope.

From the amount of weight increase accompanying the film formation, the film thickness was calculated assuming the density of the film to be 2 g/cm$^3$. The results are shown in table 1 along with the results of observation regarding the status of the film and distribution of P with an electron microscope.

As shown the results of table 1, the metal lath substrate processed by the method of the present invention has a phosphorous compound film formed wherein the film has a calculated thickness of 1.1 to 2.6 μm, is uniform and has no cracks formed. In addition, in comparing the results of Example 1 and those of Comparative Examples 2 and 3, it is clear that (1) in Comparative Example 2 where there is no surfactant, film that is thick and uniform cannot be formed, and (2) in Comparative Example 3 where the heat treatment temperature is low, the film is dissolved in water and is removed. These results clearly show that the treatment method of the present invention can provide a thick, uniform, and highly water-resistant, phosphorous compound film on the metal lath substrate and therefore is a superior method.

Test Example 2

The catalysts of Examples 3 and 4, and Comparative Examples 4 to 6 were impregnated with an aqueous solution of aluminum sulfate that contains 15% of free sulfate radical as the source of $SO_3$, such that the amount of aluminum sulfate was 5 weight %, and then dried at 150 deg C. The catalysts thus obtained were each placed in a porcelain crucible and an accelerated corrosion test involving maintaining the temperature of 450 deg C. for 300 hours was performed. The heat slowly degraded the impregnated aluminum sulfate, and the generated $SO_3$ corroded the catalyst substrate generating iron oxide. In order to measure the amount of iron oxide generated, catalyst components from the plate shaped catalysts before and after the corrosion test were scraped off, and the remaining catalyst substrates were treated with 15% ammonium succinate solution. The amount of Fe ion that dissolved out was then quantified and the amount of generated iron oxide (converted to $Fe_2O_3$ amount) was calculated from the changes of the quantified amounts before and after the test.

The results obtained are shown in table 2 below. As can be seen from the table 2, the amount of oxide generated by corrosion was significantly high in catalysts of Comparative Examples 4 to 6 in which substrates in table 1 where the film of insoluble phosphate compound was not formed was used, whereas, the amount of iron oxide generated was significantly low in catalysts of Examples 3 and 4 in which a substrate of present invention was used.

TABLE 1

| Category | Immediately after production | | After washing | | Observation by electron microscope | |
|---|---|---|---|---|---|---|
| | Increase in weight (g/m²) | Calculated film thickness (micron meter) | Increase in weight (g/m²) | Calculated film thickness (micron meter) | Status of film | P distribution |
| Ex. 1 | 2.1 | 1.0 | 2.2 | 1.1 | no cracks | uniform |
| Ex. 2 | 5.2 | 2.6 | 5.1 | 2.6 | no cracks | uniform |
| Comp. Ex. 2 | 0.1 | 0.05 | 0 | 0 | plaques | concentrated on plaques |
| Comp. Ex. 3 | 2.3 | 1.1 | 0 | 0 | no cracks | |

TABLE 2

| Category | Corrosion Amount (g/m²) |
|---|---|
| Ex. 3 | 0.7 |
| Ex. 4 | 0.5 |
| Comp. Ex. 4 | 3.6 |
| Comp. Ex. 5 | 2.6 |
| Comp. Ex. 6 | 3.1 |

EXPLANATION OF SYMBOLS

1 SUS430 band shaped plate
2 Metal lath processor
3 Metal lath
4 Degreasing apparatus
5 Solution composed of Phosphoric acid and surfactant
6 Air blow apparatus
7 Drying and heating furnace
8 Coating apparatus
9 Molding apparatus
10 Cutting device
11 Stacking step
12 Pinch rollers
13 Roll

The invention claimed is:

1. A method for producing a metal substrate for flue gas-denitration catalyst, wherein the method comprising the steps of:
   (1) degreasing process oil adhering to a band-shaped metal lath wherein the metal lath is made of a band-shaped steel plate composed of ferrite stainless steel by lath-processing;
   (2) passing the degreased metal lath through a solution containing phosphoric acid and surfactant to load the solution;
   (3) draining off the excess solution; and
   (4) drying and heating the solution-loaded metal lath to react the phosphoric acid with the metal lath,
wherein respective steps are carried out sequentially to form a film of phosphate compound on a surface of the metal lath.

2. The method according to claim 1, wherein the ferrite stainless steel plate is SUS430 stainless band-shaped steel plate.

3. The method according to claim 1, wherein the heating is performed at the temperature of 300 degrees C. or more.

4. The method according to claim 1, wherein the thickness of the corrosion resistant phosphate compound film is not less than 1 μm.

5. A method for producing a flue gas-denitration catalyst comprising the steps of:
   placing a paste of catalyst ingredient comprising titanium oxide as a main component onto the substrate obtained by the method according to claim 1;
   passing the substrate between a pair of top and bottom rollers, applying the catalyst paste into the openings and onto the surface of the metal lath; and then
   drying and firing the product obtained thereby.

6. A method for producing a metal substrate for flue gas-denitration catalyst, wherein the method comprising the steps of:
   (1) degreasing process oil adhering to a band-shaped metal lath wherein the metal lath is made of a band-shaped steel plate composed of ferrite stainless steel by lath-processing;
   (2) winding the degreased metal lath into a roll;
   (3) passing the obtained roll through a solution containing phosphoric acid and surfactant to load the solution;
   (4) draining off the solution by air blowing or by centrifugal force; and then
   (5) drying and heating the roll to form a corrosion resistant film on the metal lath surface by reaction of the phosphoric acid and the metal lath.

7. The method according to claim 6, wherein the ferrite stainless steel plate is SUS430 stainless band-shaped steel plate.

8. The method according to claim 6, wherein the heating is performed at the temperature of 300 degrees C. or more.

9. The method according to claim 6, wherein the thickness of the corrosion resistant film is not less than 1 μm.

10. A method for producing a flue gas-denitration catalyst comprising the steps of:
    placing a paste of catalyst ingredient comprising titanium oxide as a main component onto the substrate obtained by the method according to claim 6;
    passing the substrate between a pair of top and bottom rollers, applying the catalyst paste into the openings and onto the surface of the metal lath; and then
    drying and firing the product obtained thereby.

* * * * *